US 12,098,717 B2

(12) United States Patent
Werth et al.

(10) Patent No.: US 12,098,717 B2
(45) Date of Patent: Sep. 24, 2024

(54) DEVICE AND METHOD FOR THE PROVISION OF PRESSURIZED MEDIUM FOR INJECTION INTO A HIGH PRESSURE PROCESS

(71) Applicants: Uhde High Pressure Technologies GmbH, Hagen (DE); thyssenkrupp AG, Essen (DE)

(72) Inventors: Holger Werth, Unna (DE); Alexander Cosack, Bochum (DE)

(73) Assignees: Uhde High Pressure Technologies GmbH, Hagen (DE); thyssenkrupp AG, Essen (DE)

( * ) Notice: Subject to any disclaimer, the term of this patent is extended or adjusted under 35 U.S.C. 154(b) by 275 days.

(21) Appl. No.: 17/619,029

(22) PCT Filed: May 29, 2020

(86) PCT No.: PCT/EP2020/064936
§ 371 (c)(1),
(2) Date: Dec. 14, 2021

(87) PCT Pub. No.: WO2020/249407
PCT Pub. Date: Dec. 17, 2020

(65) Prior Publication Data
US 2023/0097835 A1      Mar. 30, 2023

(30) Foreign Application Priority Data

Jun. 14, 2019 (DE) ..................... 10 2019 208 707.8

(51) Int. Cl.
*F04B 9/113*     (2006.01)
*B01J 19/24*     (2006.01)
(Continued)

(52) U.S. Cl.
CPC ........... *F04B 9/113* (2013.01); *B01J 19/2415* (2013.01); *C08F 2/00* (2013.01); *C08F 2/01* (2013.01);
(Continued)

(58) Field of Classification Search
CPC .... C08F 2/01; C08F 10/02; C08F 2/00; C08F 210/02; C08F 110/02; C08F 2/38;
(Continued)

(56) References Cited

U.S. PATENT DOCUMENTS 6,135,719 A    10/2000 Yoder et al.
6,135,724 A *  10/2000 Yoder ..................... F04B 13/00
                                                                222/63
(Continued)

FOREIGN PATENT DOCUMENTS

CN    101672260 A    3/2010
CN    102913407 A    2/2013
(Continued)

OTHER PUBLICATIONS

English Translation of International Search Report issued in PCT/EP2020/064936, dated Jul. 2, 2020.
(Continued)

*Primary Examiner* — Peter J Bertheaud
(74) *Attorney, Agent, or Firm* — thyssenkrupp North America, LLC

(57) ABSTRACT

A pump injection arrangement can inject a medium at least one process position into a high-pressure process, in particular at least two different pressure levels. The pump injection arrangement includes injection pump apparatuses for the medium and a regulating unit coupled to the injection pump apparatuses and configured for regulating the injection by at least two of the injection pump apparatuses. The pump injection arrangement is configured for synchronized regu-
(Continued)

lation of the injection pump apparatuses with dependence on one another. At least two of the synchronously regulated injection pump apparatuses are double acting bidirectionally operating high-pressure pumps that are functionally coupled with at least single redundancy to the regulating unit such that pressure can be generated via at least two shafts and the pressurized medium can be made available for injection via a joint high-pressure conduit. In this way, advantageous pressure and pumping characteristics can be achieved.

13 Claims, 9 Drawing Sheets

(51) Int. Cl.
    *C08F 2/00*     (2006.01)
    *C08F 2/01*     (2006.01)
    *C08F 2/38*     (2006.01)
    *C08F 10/02*     (2006.01)
    *C08F 110/02*     (2006.01)
    *C08F 210/02*     (2006.01)
    *F04B 9/117*     (2006.01)
    *F04B 11/00*     (2006.01)
    *F04B 49/06*     (2006.01)

(52) U.S. Cl.
    CPC ............... *C08F 2/38* (2013.01); *C08F 10/02* (2013.01); *C08F 110/02* (2013.01); *C08F 210/02* (2013.01); *F04B 9/1172* (2013.01); *B01J 2219/00094* (2013.01); *B01J 2219/00159* (2013.01); *B01J 2219/00162* (2013.01); *F04B 11/005* (2013.01); *F04B 49/06* (2013.01); *Y02P 30/40* (2015.11)

(58) Field of Classification Search
    CPC .......... B01J 2219/00162; B01J 19/2415; B01J 2219/00159; B01J 2219/00006; B01J 2219/00094; F04B 9/113; F04B 9/1172; Y02P 30/40
    See application file for complete search history.

(56) References Cited

U.S. PATENT DOCUMENTS

| | | | |
|---|---|---|---|
| 6,652,741 | B1 | 11/2003 | Marinzet |
| 10,570,226 | B2 * | 2/2020 | Lammens ............ B01J 19/0006 |
| 2002/0106292 | A1 | 8/2002 | Chowaniec et al. |
| 2015/0275890 | A1 | 10/2015 | Sivaramakrishnan et al. |
| 2016/0108939 | A1 | 4/2016 | Trieb et al. |

FOREIGN PATENT DOCUMENTS

| | | |
|---|---|---|
| CN | 105240241 A | 1/2016 |
| EP | 2 268 922 A1 | 1/2011 |
| EP | 3 012 453 A2 | 4/2016 |
| EP | 3 369 527 A1 | 9/2018 |
| WO | 2006/027562 A1 | 3/2006 |

OTHER PUBLICATIONS

Introduction to Carbon I Chemistry, Editor-in-Chief: Anning Zhou, Yating Zhang, Deputy Editor-in-Chief: Yongjun He, Jiebing Zhang, Hongmei Niu, Xiaoling Zhao, Abstract attached, 6 pages (Sep. 2017).

Quantum E.S.P. Electric Servo Pump—brochure, techniwaterjet. com (2023).

* cited by examiner

DEVICE AND METHOD FOR THE PROVISION OF PRESSURIZED MEDIUM FOR INJECTION INTO A HIGH PRESSURE PROCESS

CROSS REFERENCE TO RELATED APPLICATIONS

This application is a U.S. National Stage Entry of International Patent Application Serial Number PCT/EP2020/064936, filed May 29, 2020, which claims priority to German Patent Application No. DE 10 2019 208 707.8, filed Jun. 14, 2019, the entire contents of both of which are incorporated herein by reference.

FIELD

The present disclosure generally relates to apparatuses and methods for injecting pressurized mediums into high-pressure processes.

BACKGROUND

Pumps are indispensable for equipment and control tasks in various arrangements and processes, in particular in high-pressure applications, especially in high-pressure treatments at comparatively moderate pressures of, for example, from 300 to 600 bar or at comparatively high pressures above 3000 bar up to, for example, 10 000 bar. In general, all chemical high-pressure processes can also be mentioned as illustrative field of use. In many processes, media or similar agents have to be injected into the process at particular places in the processes, with very exact controllability/regulatability. For example, comonomers have to be injected. The correct manner of injection is of great importance to the overall process. The injection or the spraying-in, squirting-in or pressing-in is, for example, required between individual compressors connected in series and/or upstream and/or downstream of and/or at reactors, for example in a plant for high-pressure treatment using ethylene, in particular with at least one high-pressure circuit or high-pressure system. For example, comonomers, modifiers (modifying agents) and/or initiators or catalysts (catalytic agents) are injected. For example, injection is carried out at from three to five places, in particular downstream of a first compressor, downstream of a second compressor, and at one or more places on/in the reactor.

Examples of types of pumps which can be employed for this purpose are spraying-in pumps, pressing-in pumps, injection pumps. Hydraulic double acting pumps have hitherto been customarily used, in particular for the injection of catalytic agents. However, it has to be accepted in the case of bidirectionally acting pumps of this type that pressure fluctuations are unavoidable or cannot be eliminated entirely, in particular at least one pressure drop when switching over or when the direction of a piston changes. This can result in disadvantages, in particular due to the periodicity, which brings about, for example, pulsation of the pressure level.

Features of double acting pumps are, in particular:
(only) hydraulic switch;
traditional reliable proven technology;
minimized servicing and maintenance requirement.

Proceeding from this traditional technology, attempts have already been made to replace double acting pumps by single acting phased flow pumps. In particular, unidirectionally acting phased flow pumps can also be used particularly advantageously for achieving a very constant, homogeneous manner of injection. As further known advantages which can be realized by means of unidirectional phased pumps, particular mention may be made of:

maintenance intervals of greater than two years, in particular also in respect of valves;
stable process, in particular thanks to phase regulation;
high operational readiness, good availability or usability;
advantageous standby properties.

On the other hand, the advantages of phased flow pumps cannot be utilized purposefully in all arrangements. For example, the equipment or process requirements when using phased flow pumps can become comparatively high.

Optimization of the pump technology can in many cases be carried out only for an individual case. Package optimization recommendations tend rather not to be able to be dialed up, or do not take the individual case into account. In many cases, an individual compromise has to be found for each plant, in particular in respect of throughput or flow or transport power, process stability, accuracy and reproducibility, plants and processes costs. Narrow customer requirements ultimately have to be taken into account for each individual pump in many cases.

Relatively new technological developments should, for example, also be focused on pumps having improved pressure characteristics compared to double acting pumps, especially in order to achieve a very constant, homogeneous manner of injection. There is thus interest in further purposeful measures for providing a pump architecture which can be optimized in a simple way.

Thus a need exists for an apparatus and a method whereby media can be injected into high-pressure processes in an optimized way, in particular at least comparable to the pump characteristics or pressure characteristics that have hitherto already been able to be realized when using phased flow pumps, in particular as far as possible with avoidance of pressure pulses due to a recurring technology-related pressure drop. A need also exists for pump technology such that a desired pressure level can be ensured in a very exact way constantly over a definable period of time at a justifiable engineering outlay, in particular also at comparatively high transport powers, in particular at a high pressure level.

In some examples, a pump injection arrangement configured for injecting at least one medium at least one process position into at least one high-pressure process, in particular at least two different pressure levels, may comprise a plurality of injection pump apparatuses for at least one medium; a regulating unit which is coupled to the injection pump apparatuses and is configured for regulating the injection by at least two of the injection pump apparatuses; where the pump injection arrangement is configured for synchronized regulation of the injection pump apparatuses with dependence on one another; wherein at least two of the synchronously regulated injection pump apparatuses are double acting bidirectionally operating high-pressure pumps which are functionally coupled with at least single redundancy to the regulating unit in such a way that the pressure can be generated via at least two shafts and the pressurized medium can be made available for injection via a joint high-pressure conduit. In this way, advantages of a proven technology can be realized even with a view to strict requirements for homogeneous pressure characteristics. In particular, pressure characteristics optimized in respect of constancy and pressure level can be ensured. Specifically, pulsations can be minimized.

DETAILED DESCRIPTION

Figure 1:
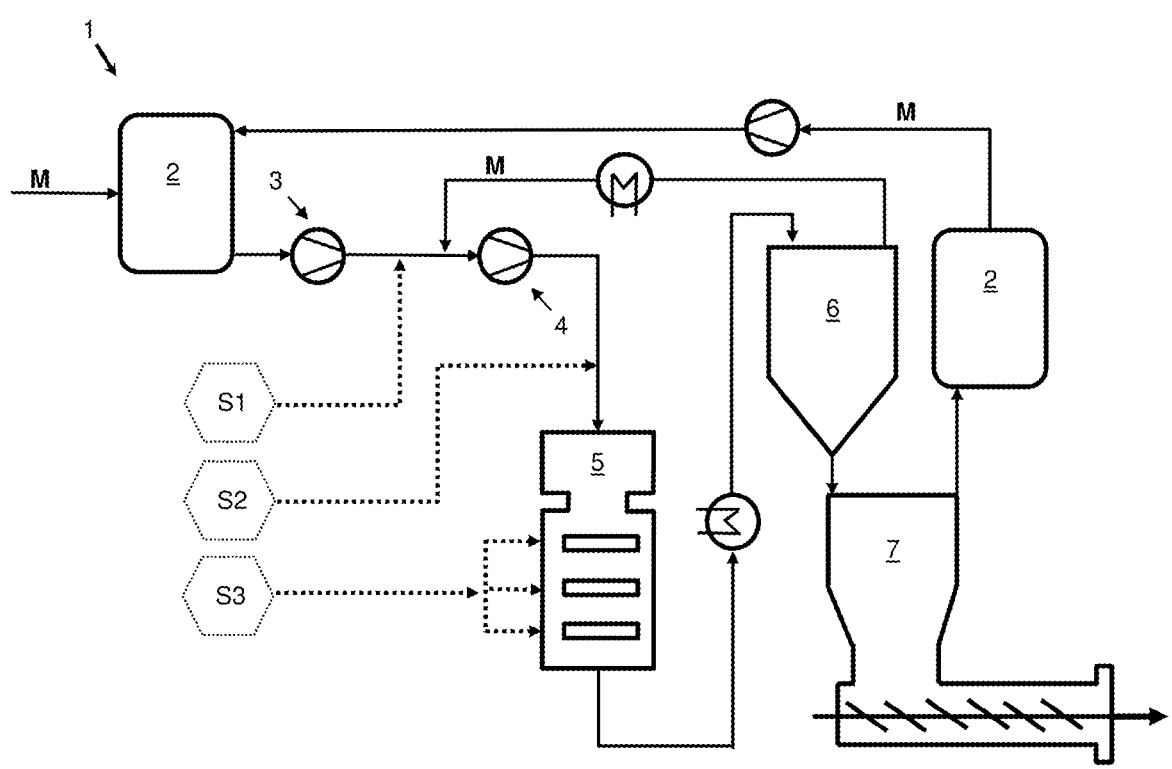
FIG. 1 is a flow diagram of an example process to which the present disclosure can be applied.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The high-pressure conduit or the joint high-pressure conduit can be a single high-pressure conduit for all pump injection arrangements.

The concept according to the invention can also be described as follows: traditional double acting pumps are connected to one another in a plurality in regulated combination in order to overcome, in particular, the disadvantages of phased pumps at high throughputs.

The measures according to the invention also give cost advantages, in particular above relatively high flow rates. It has also been found that, based on phased pumps, the outlay for reinforcers (pressure increasers) becomes comparatively high (in particular because of greater amounts of hydraulic medium, larger size of the hydraulic fittings).

The injection pump apparatuses can, for example, be coupled to a high-pressure reactor and/or to one or more (high-pressure) conduit sections upstream of the reactor.

The injected medium comprises, for example, olefins, substances having a double bond, alkenes, propylene or the like.

The term "pump injection arrangement" or "pump" can also comprise pressure transformers. In other words: the term "bidirectional pump" can also encompass double acting pressure transformers.

In an embodiment, the injection pump apparatuses are synchronized with dependence on one another in such a way that a phase offset of 180° of pistons of at least two of the bidirectional injection pump apparatuses is set. In this way, a very advantageous arrangement can be provided even using only two connected bidirectional pumps. This also makes an optimized construction combined with a minimum engineering outlay possible.

In an embodiment, the respective double acting high-pressure pump has a double acting hydraulic cylinder which is connected to two high-pressure heads in such a way that a joint high-pressure conduit is provided. In this way, the pressure characteristics can be optimized in an elegant way, in particular without use of unidirectionally operating pump technology.

In an embodiment, the pump injection arrangement has at least one linear position transducer coupled to one or more shafts of the pump injection arrangement. This assists precise position-dependent regulation. In particular, a respective piston can be monitored exactly.

For example, the pump injection arrangement comprises at least one double acting pump which is regulated in a closed regulating circuit, in particular with the pump injection arrangement comprising at least one position sensor, preferably a linear position transducer.

In an embodiment, the plurality of injection pump apparatuses are functionally coupled in a plurality of closed regulating circuits, in particular with the pump injection arrangement comprising linear position transducers coupled to each of the pump injection arrangements. In this way, the type and manner of regulation can be optimized.

In an embodiment, the pump injection arrangement is configured for injecting the medium at flow rates of greater than 150 liters per hour, in particular for a medium in the form of comonomers, in particular upstream of a high-pressure reactor.

In an embodiment, the pump injection arrangement comprises exclusively bidirectional injection pump apparatuses.

In an embodiment, the pump injection arrangement comprises at least three injection pump apparatuses for the at least one medium, where at least three of the injection pump apparatuses are double acting high-pressure pumps which are functionally coupled with at least double redundancy to the regulating unit in such a way that the pressure can be generated via at least three shafts and the pressurized medium can be provided for injection via the joint high-pressure conduit. This gives further advantages. In particular, the abovementioned advantages can be made more concrete.

In an embodiment, the three shafts are synchronized in such a way that a phase offset of individual pistons of the injection pump apparatuses of not more than 120° is set.

The abovementioned object is also achieved according to the invention by, in particular, a method for controlling and/or regulating a pump injection arrangement during injection of at least one medium at at least one process position into at least one high-pressure process, in particular a medium from the group consisting of comonomers, initiators, modifiers; in particular in a high-pressure treatment process comprising multistage pressure buildup and a high-pressure reaction;

wherein injection by means of a plurality of injection pump apparatuses is regulated in a synchronized manner by a regulating unit with dependence of the injection pump apparatuses on one another, where at least two of the synchronously regulated injection pump apparatuses are operated as double acting bidirectionally operating high-pressure pumps and are functionally regulated with at least single redundancy in such a way that the pressure is generated via at least two shafts and the pressurized medium is made available for injection via a joint high-pressure conduit. This gives advantages as indicated above.

Comonomers, catalysts or initiators and/or modifiers, for example, are injected as medium. In the case of polymerization as high-pressure process, the initiators which can be used may also be referred to as free-radical starters.

For example, modifiers are injected and comonomers are injected at a first process position downstream of a first compression stage and upstream of a second compression stage, and comonomers are injected at a second process position downstream of all compression stages, and initiators are injected at at least one position on the reactor.

In an embodiment, at least two of the injection pump apparatuses are regulated with a phase offset of 180° of the pistons with dependence on one another.

In an embodiment, the pressurized medium is provided at the appropriate process position on a single joint high-pressure conduit of all injection pump apparatuses regulated for this process position.

In an embodiment, the regulation is carried out position-based on the basis of measured data of at least one linear position transducer coupled to one or more shafts of the pump injection arrangement.

In an embodiment, regulation is carried out in a closed regulating circuit. This can, in particular, also optimize the degree of self-sufficiency or automation. Regulating parameters can optionally be set here as a function of operating parameters of the individual pumps and/or as a function of high-pressure process parameters.

In an embodiment, comonomers are injected as medium at flow rates of greater than 150 liters per hour or greater than 500 liters per hour, in particular regulated in such a way that the comonomers are injected exclusively by means of double acting pumps above this pump output.

Particularly at an increasing throughput, a larger number of reinforcers become necessary in the case of unidirectionally operating systems owing to limited speed. It has been found that at a throughput of, for example, about 500 liters per hour, at least six phased flow pumps were necessary on the high-pressure side. According to the invention, this engineering outlay can be saved, especially by bidirectional pump systems being connected to one another and phased flow pumps being dispensed with entirely.

In an embodiment, the pressurized medium is provided exclusively by means of bidirectionally operating injection pump apparatuses.

In an embodiment, the arrangement comprises at least three synchronously regulated injection pump apparatuses which are operated as double acting bidirectionally operating high-pressure pumps and are functionally regulated with at least double redundancy in such a way that the pressure can be generated via at least three shafts and the pressurized medium is provided for injection via the joint high-pressure conduit.

In an embodiment, a phase offset of individual pistons of the injection pump apparatuses of not more than 120° is set, in particular in the case of exactly three bidirectional injection pump apparatuses.

The abovementioned object is also achieved according to the invention by a control device configured for carrying out a method as described above, wherein the control device is coupled to at least two injection pump apparatuses each configured as double acting bidirectional high-pressure pumps, where the control device comprises a regulating unit which is configured for regulating a phase offset of 180° or not more than 120° of two or three of the injection pump apparatuses with dependence on one another.

The abovementioned object is also achieved according to the invention by use of at least two injection pump apparatuses each configured as double acting bidirectional high-pressure pumps in a high-pressure system, in particular in a pump injection arrangement described above, for injection of highly pressurized medium, in particular for injection of comonomers, in particular in a method described above, in particular at flow rates of the injected medium of greater than 150 liters per hour, where the at least two injection pump apparatuses are regulated with a phase offset of 180° or not more than 120° with dependence on one another.

Further features and advantages of the invention may be derived from the description of at least one embodiment with the aid of drawings, and also from the drawings themselves. In the case of reference symbols which are not explicitly described in relation to one figure, reference may be made to the other figures. The drawings show FIG. 1 shows an illustrative high-pressure treatment process having a plurality of injection positions. A high-pressure system 1 comprises vessels 2 designed for high pressure, a primary compressor 3, a secondary compressor 4 (in particular hypercompressor), a reactor 5, a high-pressure separator 6 and a low-pressure separator 7. Process medium M, for example ethylene, is conveyed from the first vessel 2 via the compressors and the reactor and the separators to the second vessel 2, and is conveyed from the second vessel 2 back to the first vessel 2, with an internal return circuit from the high-pressure separator 6 also being provided before the hypercompressor 4. The process medium M is not the same as the injected medium.

An injection of medium is carried out, for example, at at least three process positions, in particular in each case by means of an individual pump injection arrangement, or optionally also by means of a single pump injection arrangement for at least two or more process positions. A pump arrangement according to the invention for building up the pressure can be realized for each of the injection steps S1, S2, S3 described below.

In a step S1, an injection of comonomers and modifiers, in particular, is carried out, especially to a first pressure level. In a step S2, an injection of comonomers, in particular, is carried out, especially to a second pressure level higher than the first pressure level, in particular downstream of all compressors of the process. This can, for example, be advantageous in the case of comonomers in the liquid phase, especially also for the purpose of minimizing the load on compressors. In a step S3, an injection of catalysts, in particular, is carried out, especially to the second pressure level or to a further even higher pressure level.

The steps S1, S2, S3 indicate by way of example the positions in the process where an injection can be necessary, in particular a high-pressure injection. In the following, the technology by means of which the respective (high-pressure) injection can preferably be carried out will be explained in more detail. A pressure monitoring and radial expansion steps can also be carried out here.

Figure 2:
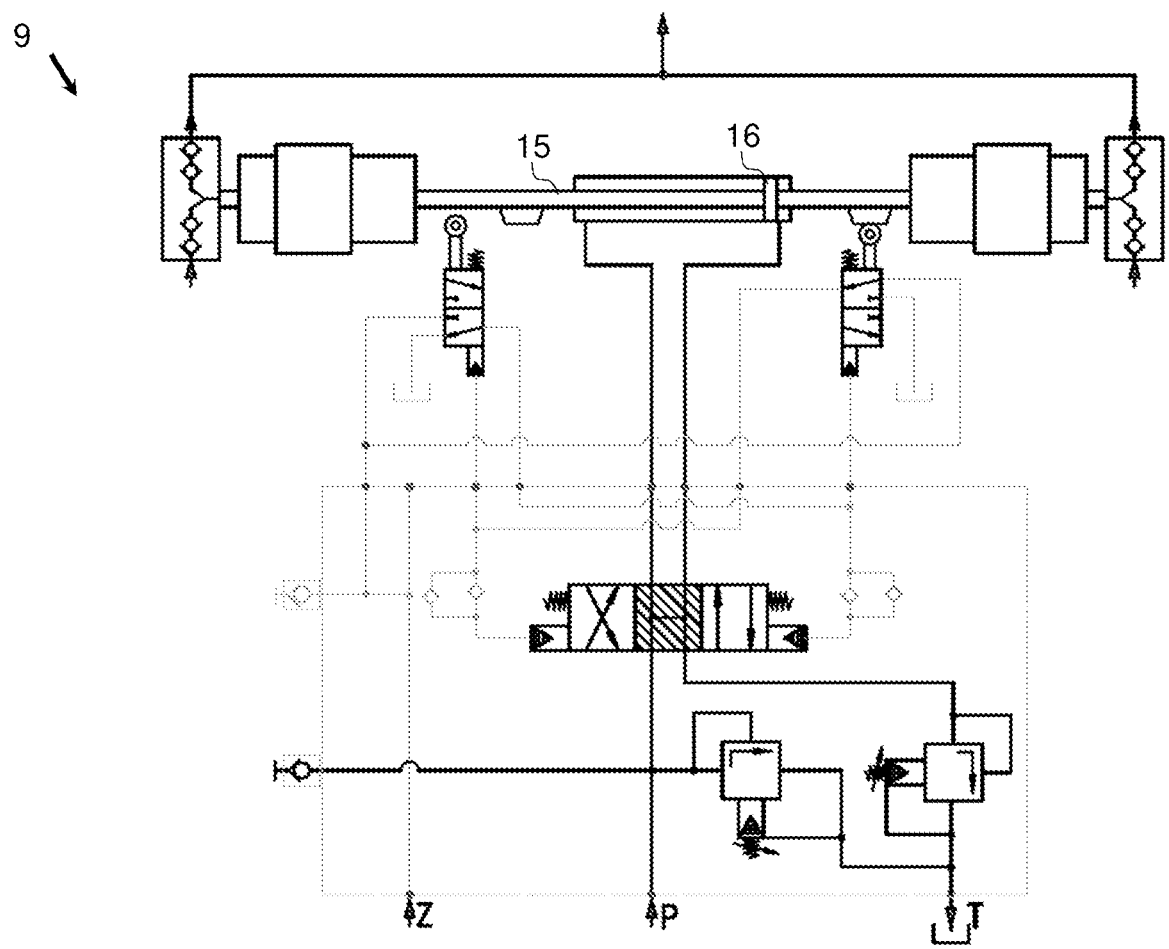
FIG. 2 is a schematic view of an example double acting pump.

FIG. 2 shows by way of example the structure of a double acting bidirectionally operating high-pressure pump, in particular without implementation of regulation according to the invention. In a double acting hydraulic cylinder, a piston 16 acts on a shaft 15 which is connected to two high-pressure heads (plunger pumps).

Figure 3A:
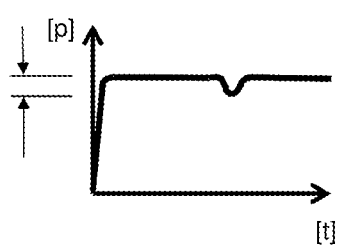
FIG. 3A depicts pressure pulsation when using a bidirectionally operating pump, above a schematic of a double acting pump.
Figure 3A:
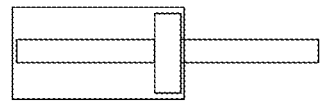
Figure 3B:
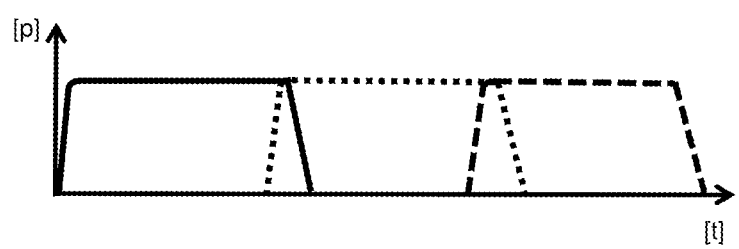
FIG. 3B depicts pump characteristics or a pressure profile that is achievable when a plurality of pumps are connected, above a schematic of three single-acting phased pumps.
Figure 3B:
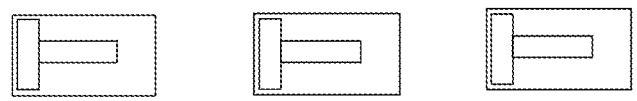

In the graphs shown in FIG. 3A, 3B, the pressure [p] is in each case plotted against time [t].

FIG. 3A illustrates pressure pulsation when using a bidirectionally operating pump. This pulsation occurs, in particular, periodically during operation and is stronger or weaker, in terms of absolute value or percentage, depending on the quality of the pump. In FIG. 3A, a schematic illustration of a double acting pump is shown underneath the graph for the sake of completeness.

FIG. 3B shows pump characteristics or a pressure profile which can be realized by means of three unidirectional pumps connected to one another. Pressure pulses can be at least largely avoided. A respective pump is relieved by one of the further pumps as soon as the further pump has built up the desired pressure level to be maintained (intermittent operation without appreciable time overlap). In FIG. 3B, a schematic illustration of three single-acting phased pumps is shown underneath the graph for the sake of completeness.

Figure 4:
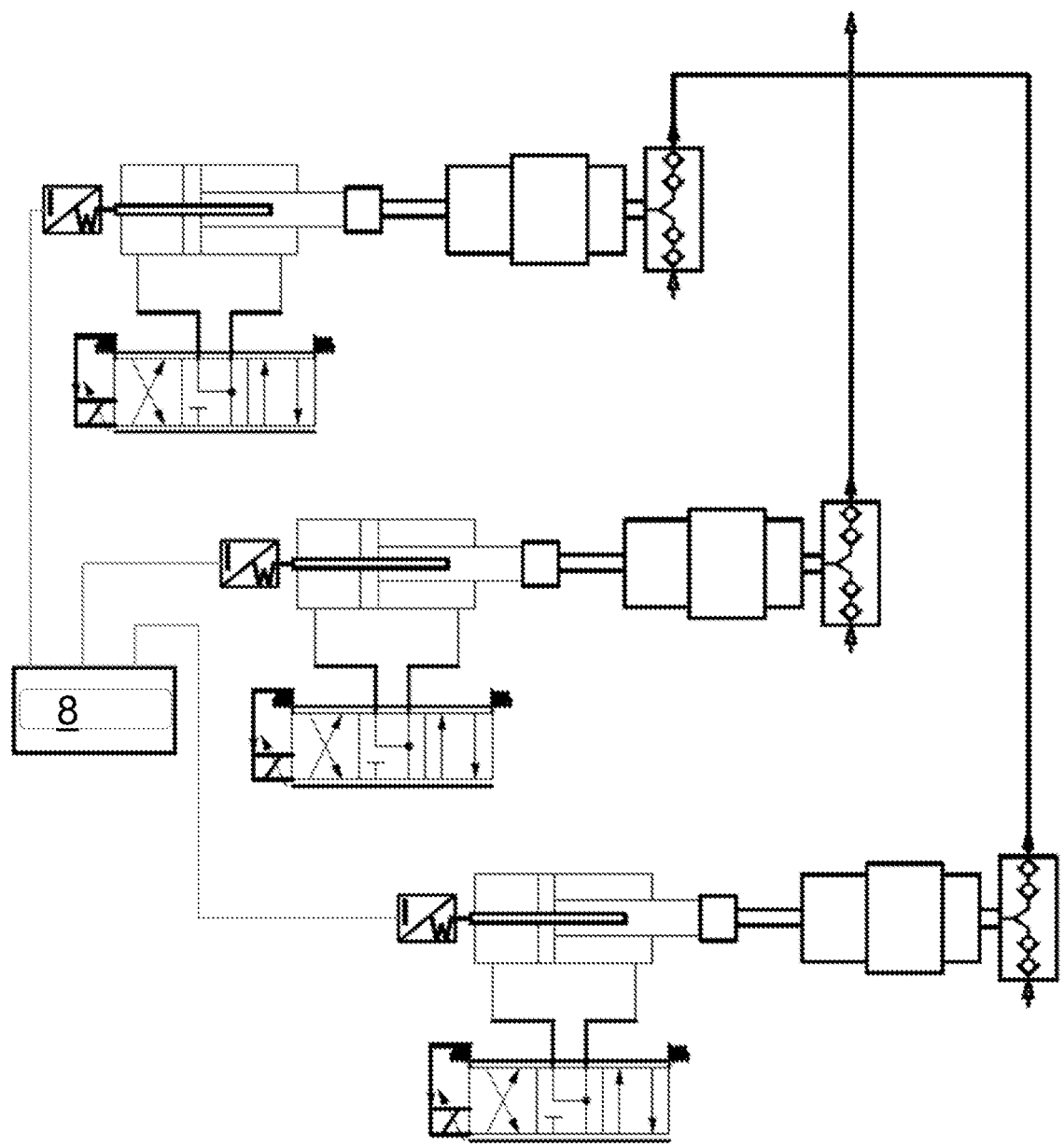
FIG. 4 is a schematic view of an example phased pump that can be used for injection of catalyst.

FIG. 4 shows by way of example the structure of an arrangement of three unidirectionally operating high-pressure pumps. To regulate the interplay of the individual unidirectionally operating pumps, a regulator 8 is provided; each of the three pumps is coupled to the regulator 8. Advantages of this arrangement: advantageous pressure characteristics; good availability. However, this arrangement can become disadvantageous, especially above throughputs of greater than 150 liters per hour.

Figure 5:
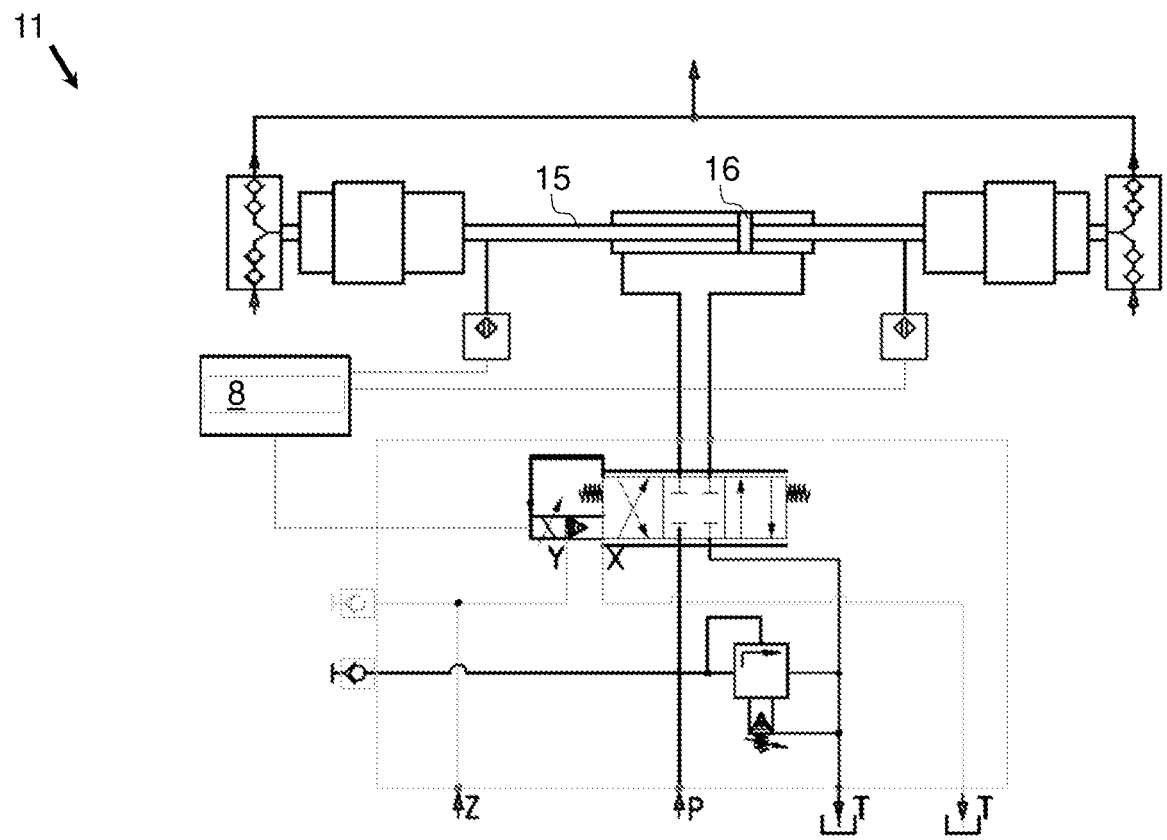
FIG. 5 is a schematic view of an example double acting pump having an implemented open regulating circuit, for use or implementation in a pump injection arrangement according to the present disclosure.

FIG. 5 shows a bidirectionally operating pump unit 11 having a regulator 8 which regulates the pump unit 11 in an open regulating loop. Proximity switches are provided on the shaft 15 on both sides of the cylinder. Advantages of this arrangement: high throughput, especially thanks to a comparatively large plunger size; proximity switches for switching over; movement regulation based on ratio of amounts or by means of a proportionality valve; switchover point in time able to be set quickly and promptly. It has been found that the arrangement shown in FIG. 5 can be optimized further.

Figure 6:
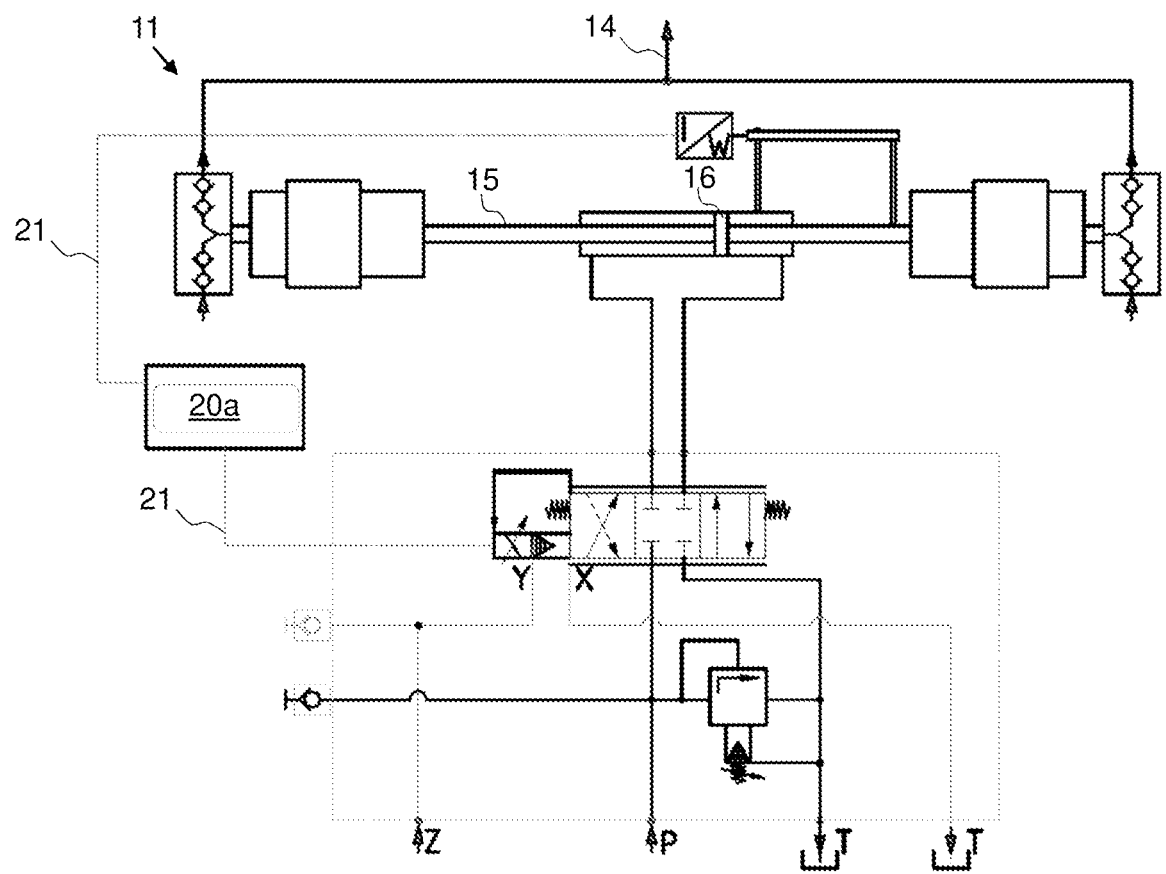
FIG. 6 is a schematic view of an example double acting pump having an implemented closed regulating circuit, for use or implementation according to the present disclosure in a pump injection arrangement.

FIG. 6 shows a bidirectionally operating pump unit 11 having a regulating unit 20a which regulates the pump unit 11 in a closed regulating loop. A linear position transducer and a closed PID regulating loop make a fast autonomously regulated switchover procedure possible. Advantages of this arrangement: optimized regulating properties, in particular also in the case of a system comprising further connected bidirectional pump units.

A double acting hydraulic cylinder, in which a piston 16 operates, is connected to two high-pressure heads (plunger pumps). A double acting high-pressure pump having a joint high-pressure conduit 14 is formed. A first control line 21 connects the regulating unit 20a to the appropriate components of the pump 11. The regulating unit 20a is configured for synchronizing a plurality of bidirectional pump units with a phase offset, in particular as a function of the number of the synchronized pump units.

Such a double acting pump 11 having a shaft 15 and in particular also having a displacement measuring system and proportional valve for the hydraulics can be implemented according to the invention in a phase offset-synchronized configuration which optionally has absolutely no phased flow pumps.

Figure 7:
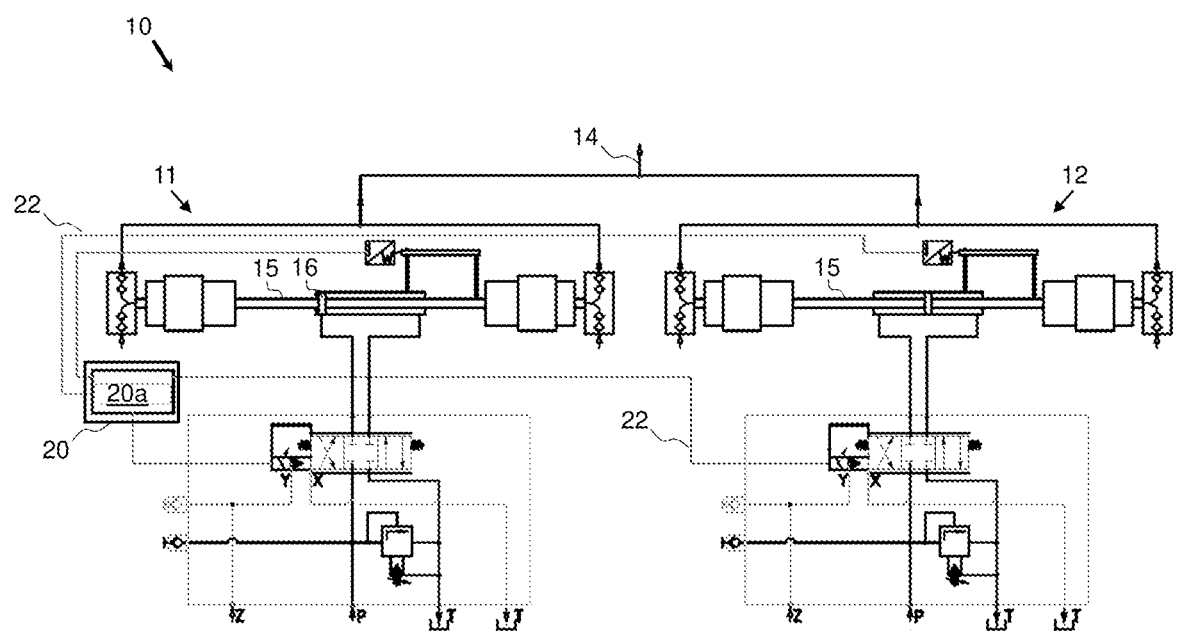
FIG. 7 is a schematic view of an example singly redundant pump injection arrangement according to the present disclosure comprising double acting pumps, with two pump shafts and with an implemented open regulating circuit.

FIG. 7 shows a pump injection arrangement 10 as per a first embodiment having a control/regulating device 20 which regulates a first injection pump apparatus 11 and a second injection pump apparatus 12 in a matched fashion.

In this configuration as singly redundant pump injection arrangement 10 having two shafts 15, in each case provided by an injection pump apparatus 11, 12, advantageous synchronization in respect of phase offset can be realized with minimal engineering outlay. Two regulating circuits 21, 22 are synchronized by means of the regulating unit 20a by a phase offset of 180° being set. One of the shafts 15 switches over while the other shaft (or the corresponding piston 16) is located precisely in the middle (middle position), and vice versa: first piston 16 at the stop, second piston in the middle position. This two-shaft pump arrangement gives twice the volume flow compared to the single shaft arrangement. It has been found that this two-shaft pump arrangement can be operated at half speed for the volume flow of a single shaft arrangement. This not least also increases the operating life of the high-pressure components to a considerable extent. The two-shaft arrangement can optionally be operated using only one shaft, especially in the case of maintenance work/technical malfunctions.

Advantages of this arrangement: comparatively low speeds; comparatively small fluctuation or variation of the throughput volume; optionally doubled throughput rate at maximum operating load (maximum piston speed).

Figure 8:
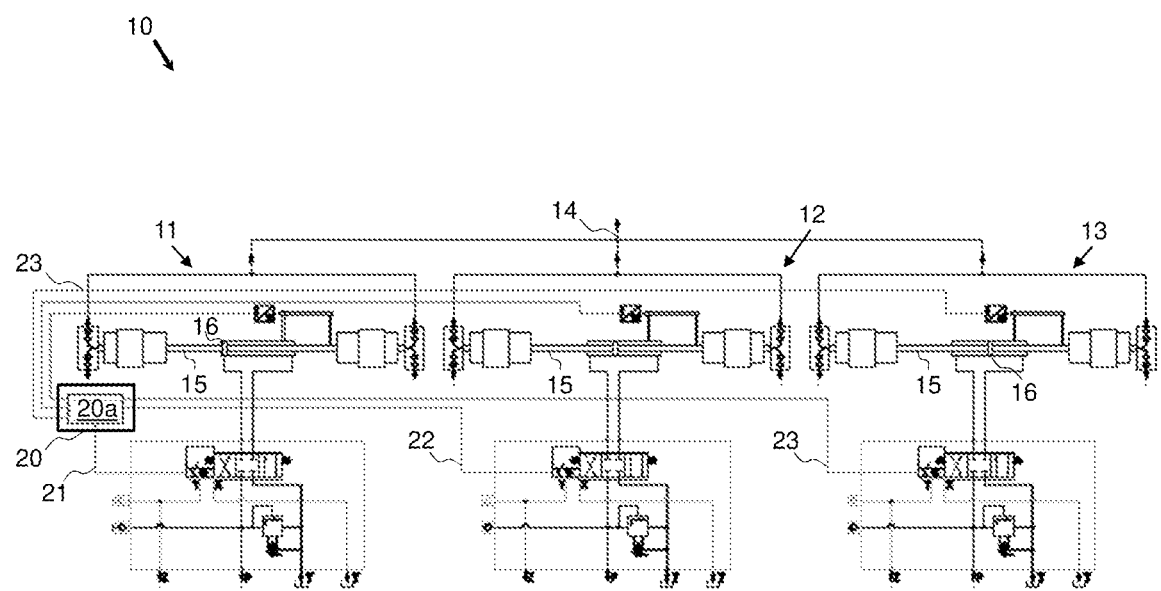
FIG. 8 is a schematic view of an example doubly redundant pump injection arrangement according to the present disclosure comprising double acting pumps, with three pump shafts and with an implemented open regulating circuit.

FIG. 8 shows a pump injection arrangement 10 according to a second embodiment having three injection pump apparatuses 11, 12, 13 coupled to one another by regulation (three head arrangement). The joint high-pressure conduit 14 is supplied by all three injection pump apparatuses.

In this configuration as doubly redundant pump injection arrangement 10 having three shafts 15, the advantages can be realized even more perceptibly, especially also in respect of operational reliability, compared to the arrangement having only two shafts. In particular, the three individual shafts 15 are in normal operation arranged with a phase offset of 120° or controlled/regulated via the corresponding regulating circuits 21, 22, 23 (first piston 16 at the stop, second piston ⅓ offset; third piston ⅔ offset). This pump injection arrangement 10 gives, for example, the same maximum high-pressure volume flow as a two-shaft pump injection arrangement. At a maximum volume flow, a travel speed reduced by ⅓ can be realized for each shaft 15. Each shaft travels at only ⅔ of its mechanically/technically possible maximum speed, which also ensures particularly gentle operation.

Figure 9:
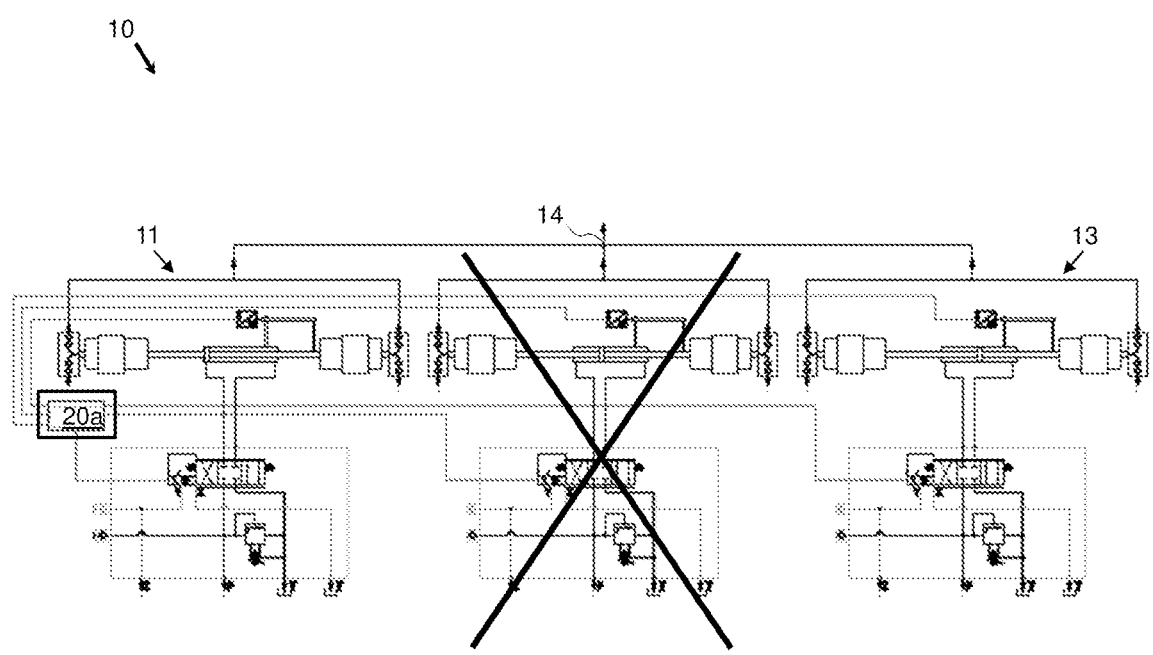
FIG. 9 is schematic view of an example regulating option of a doubly redundant pump injection arrangement according to the present disclosure.

The arrangement shown in FIG. 8 enables the advantages of the invention to be ensured even more comprehensively, especially also in respect of operation having even lower pulsation, or also in respect of greater failure safety or additional maintenance options, as illustrated in FIG. 9: one of the three double acting pumps 11, 12, 13 can optionally be switched off or be decoupled from the pump injection arrangement 10 (here by way of example the middle injection pump apparatus 12).

If one of the shafts 15 fails for maintenance reasons or technical malfunctions, the two remaining shafts can be accelerated to the mechanically/technically possible speed and the phase offset can be brought to 180°. The volume flow of the total arrangement can thus be kept constant and pulsation is minimized even in out-of-the-ordinary situations. In other words: advantages in respect of standby properties can also be realized in addition to the advantages mentioned above in respect of FIG. 7.

LIST OF REFERENCE SYMBOLS

1 High-pressure system
2 (High-pressure) vessel (buffer, collection vessel)
3 Primary compressor
4 Secondary compressor, in particular hypercompressor
5 Reactor
6 High-pressure separator
7 Low-pressure separator
8 Regulator
9 Double acting high-pressure pump, in particular unregulated
10 Pump injection arrangement
11 First injection pump apparatus, in particular double acting high-pressure pump
12 Second injection pump apparatus, in particular double acting high-pressure pump
13 Third injection pump apparatus, in particular double acting high-pressure pump
14 (Joint) high-pressure conduit, for injection
15 Individual pump shaft
16 Piston
20 Control/regulating device
20a Controller unit
21 First control line
22 Second control line
23 Third control line
M Process medium, in particular ethylene
S1 Step 1, in particular injection of comonomers and modifiers
S2 Step 1, in particular injection of comonomers
S3 Step 1, in particular injection of catalysts
p Pressure
t Time

What is claimed is:

1. A high-pressure system comprising:
a vessel configured for high pressure;
a primary compressor;
a secondary compressor;
a high-pressure reactor;
a high-pressure separator;
a low-pressure separator, and
a pump injection arrangement configured to inject a medium at at least two different pressure levels into either the high-pressure reactor or a high-pressure polymerization process upstream of the high-pressure reactor, wherein the pump injection arrangement comprises:
injection pump apparatuses for the medium comprising olefins, substances having a double bond, alkenes, or propylene, wherein the injection pump apparatuses are coupled to at least one of the high-pressure reactor or to a high-pressure conduit section upstream of the high-pressure reactor, and
a regulating unit that is coupled to the injection pump apparatuses and is configured to regulate injection by at least two of the injection pump apparatuses,
wherein the pump injection arrangement is configured to synchronize regulation of the injection pump apparatuses with one another and to inject the medium at flow rates of greater than 150 liters per hour,
wherein at least two of the injection pump apparatuses that are synchronously regulated are double acting bidirectionally operating high-pressure pumps that are functionally coupled with at least single redundancy to the regulating unit such that a pressure is generated via at least two shafts and such that the medium under pressure is made available for injection via a high-pressure conduit.

2. The high-pressure system of claim 1 wherein the injection pump apparatuses are synchronized with one another such that a phase offset of 180° of pistons of at least the double acting bidirectionally operating high-pressure pumps is set.

3. The high-pressure system of claim 1 wherein each double acting bidirectionally operating high-pressure pump includes a double acting hydraulic cylinder that is connected to two high-pressure heads to provide the high-pressure conduit.

4. The high-pressure system of claim 1 wherein the pump injection arrangement has a linear position transducer coupled to one or more shafts of the pump injection arrangement.

5. The high-pressure system of claim 1 wherein the injection pump apparatuses are functionally coupled in a closed regulating circuit, wherein the pump injection arrangement includes a proximity switch coupled to one or more shafts of the pump injection arrangement.

6. The high-pressure system of claim 1 wherein the pump injection arrangement comprises at least three of the injection pump apparatuses, wherein the at least three of the injection pump apparatuses are double acting high-pressure pumps that are functionally coupled with at least double redundancy to the regulating unit such that the pressure is generated via at least three shafts and such that the medium under pressure is provided for injection via the high-pressure conduit.

7. The high-pressure system of claim 6 wherein the at least three shafts are synchronized such that a phase offset of pistons of the injection pump apparatuses is set at 120° or less.

8. A method for controlling and/or regulating the pump injection arrangement of the high-pressure system of claim 1 during injection of a medium comprising comonomers, initiators, or modifiers at a process position of a high-pressure polymerization process comprising multistage pressure build-up and a high-pressure reaction, the method comprising:
regulating the injection pump apparatuses in a synchronized manner with the regulating unit with dependence of the injection pump apparatuses on one another;
operating at least two of the injection pump apparatuses as double acting bidirectionally operating high-pressure pumps;
functionally regulating the at least two of the injection pump apparatuses with at least single redundancy such that a pressure is generated via at least two shafts and the medium under pressure is made available for injection via a high-pressure conduit;
injecting the medium at flow rates of greater than 150 liters per hour, wherein at the flow rates of greater than 150 liters per hour the medium is injected exclusively by the double acting bidirectionally operating high-pressure pumps.

9. The method of claim 8 comprising either:
regulating at least two of the injection pump apparatuses with a phase offset of 180° of pistons with dependence on one another; or
setting a phase offset of pistons of the injection pump apparatuses at not more than 120°.

10. The method of claim 8 comprising providing the medium under pressure at the process position on a high-pressure conduit of all of the injection pump apparatuses regulated for the process position.

11. The method of claim 8 wherein the regulation is position-based on a basis of measured data of a linear position transducer coupled to one or more shafts of the pump injection arrangement.

12. The method of claim 8 wherein the regulation is performed in a closed regulating circuit.

13. The method of claim 8 wherein at least three of the injection pump apparatuses that are synchronously regulated are operated as double acting bidirectionally operating high-pressure pumps and are functionally regulated with at least double redundancy such that the pressure is generated via at least three shafts and such that the medium under pressure is provided for injection via the high-pressure conduit.

\* \* \* \* \*